UNITED STATES PATENT OFFICE.

CHARLES H. GRAHAM, OF ROCHESTER, PENNSYLVANIA, ASSIGNOR TO JAMES RANSOM, OF SAME PLACE.

IMPROVEMENT IN COMPOSITIONS FOR COATING BOILERS.

Specification forming part of Letters Patent No. 149,744, dated April 14, 1874; application filed March 17, 1874.

*To all whom it may concern:*

Be it known that I, C. H. GRAHAM, of Rochester, in the county of Beaver and State of Pennsylvania, have invented a certain new and useful Composition for Coating Boilers; and I do hereby declare the following to be a full, clear, and exact description of the invention, such as will enable others skilled in the art to which it pertains to make and use it.

This invention has relation to an improved composition for coating steam-boilers, drums, and pipes; and it consists in the combination of the following-named ingredients in the proportions substantially as given:

Fire-clay, thirty per cent.; wood ashes, twenty per cent.; pulverized charcoal, twenty per cent.; common salt, ten per cent.; ground lime, ten per cent.; ground asbestus, ten per cent.

In some cases the lime may be omitted, but I prefer generally to retain it. The whole to be ground in oil, forming a paste which may be mixed with sufficient hair to make it tenacious, and applied in any suitable and convenient manner.

Having fully described my invention, I claim—

The composition for coating boilers consisting of the ingredients specified, combined substantially in the proportions specified.

In testimony that I claim the foregoing, I have hereunto set my hand this 14th day of March, 1874.

CHAS. H. GRAHAM.

Witnesses:
 JAMES RANSOM,
 J. A. SHALES.